(12) United States Patent
Aune

(10) Patent No.: US 11,968,306 B2
(45) Date of Patent: Apr. 23, 2024

(54) PUF KEY TRANSFER

(71) Applicant: Nordic Semiconductor ASA, Trondheim (NO)

(72) Inventor: Frank Aune, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 59 days.

(21) Appl. No.: 17/751,030

(22) Filed: May 23, 2022

(65) Prior Publication Data

US 2022/0376920 A1  Nov. 24, 2022

(30) Foreign Application Priority Data

May 24, 2021 (GB) ...................................... 2107395

(51) Int. Cl.
*H04L 9/32* (2006.01)
*H04L 9/08* (2006.01)

(52) U.S. Cl.
CPC .......... *H04L 9/3234* (2013.01); *H04L 9/0869* (2013.01); *H04L 9/3278* (2013.01)

(58) Field of Classification Search
CPC ... H04L 9/3234; H04L 9/0869; H04L 9/3278; H04L 9/0877; H04L 9/0827; H04L 9/003; H04L 9/0819; H04L 9/002; H04L 63/06; H04L 9/32; G06F 21/73; G06F 7/588; G06F 13/38; G06F 15/7807; G06F 21/602; G06F 21/85

See application file for complete search history.

(56) References Cited

U.S. PATENT DOCUMENTS

| 10,620,848 | B2 | 4/2020 | Simons et al. | |
|---|---|---|---|---|
| 2018/0278418 | A1* | 9/2018 | Chang | H04L 9/0891 |
| 2020/0322160 | A1* | 10/2020 | Torvinen | H04L 9/0618 |
| 2022/0131713 | A1* | 4/2022 | Schifmann | H04L 9/3278 |
| 2023/0121502 | A1* | 4/2023 | Lu | H04L 9/3278 380/46 |
| 2023/0163980 | A1* | 5/2023 | Cambou | H04L 9/0869 713/165 |

FOREIGN PATENT DOCUMENTS

EP  3 407 335 A1  11/2018

OTHER PUBLICATIONS

IPO Search Report under Section 17 for GB2107395.2, dated Mar. 8, 2022, 4 pages.

* cited by examiner

*Primary Examiner* — Quazi Farooqui
(74) *Attorney, Agent, or Firm* — Klarquist Sparkman, LLP

(57) ABSTRACT

An integrated-circuit device comprises a physical-unclonable-function (PUF) unit, a secure module, and an interconnect system communicatively coupled to the PUF unit and to the secure module. The device transfers a PUF key from the PUF unit to the secure module, over the interconnect system. In order to do this, the secure module generates a random value. The secure module then sends the random value to the PUF unit. The PUF unit then performs a bitwise XOR operation between the received random value and the PUF key, to generate a masked value. The PUF unit then transfers the masked value over the interconnect system to the secure module. The secure module then unmasks the PUF key by performing a bitwise XOR operation between the received masked value and the random value.

15 Claims, 2 Drawing Sheets

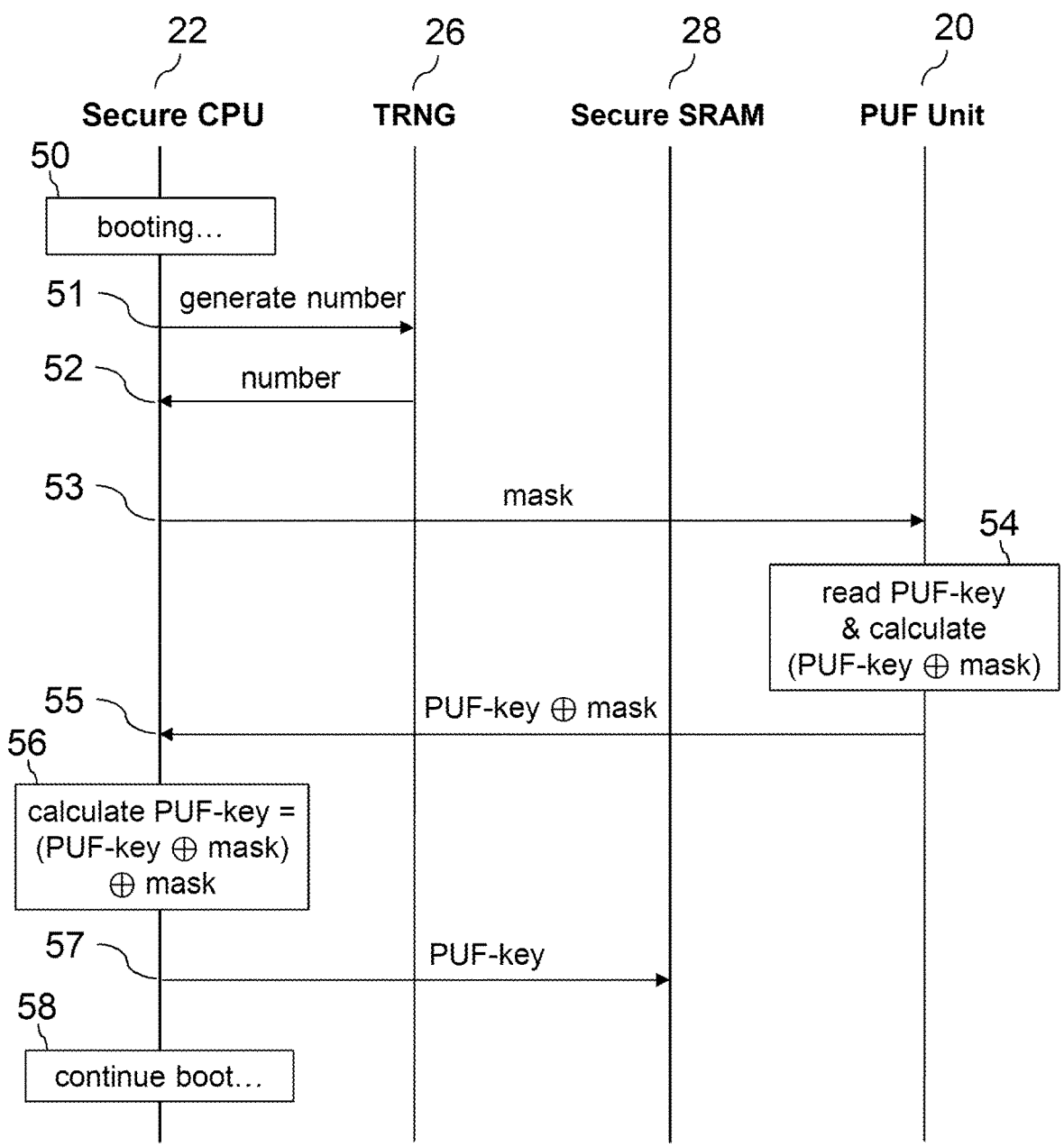

PUF KEY TRANSFER

CROSS-REFERENCE TO RELATED APPLICATION

This application claims priority from United Kingdom Patent Application No. 2107395.2, filed May 24, 2021, which application is incorporated herein by reference in its entirety.

BACKGROUND OF THE INVENTION

This invention relates to transferring a physical-unclonable-function (PUF) key over a bus system within an integrated-circuit device.

It is known for integrated-circuit devices, such as system-on-chips (SoCs), to contain a PUF unit that generates an unchanging, device-specific value, commonly referred to as a PUF key. Unlike a device identifier, the PUF key is kept secret within the device. It can be used by the device for cryptographic processes, such as a secret key for encrypting and decrypting a region of secure memory within the device, or as a seed for deriving cryptographic key pairs. The PUF key can thus serve as a form of secret digital "fingerprint" unique to the particular device.

A silicon-based integrated-circuit PUF unit can generate a unique PUF key by exploiting extremely subtle manufacturing variations that are unique to each device even across a set of device all fabricated using the same mask. The PUF unit is unclonable in that it is practically impossible to duplicate a PUF unit such that both units generate the same PUF key.

A challenge with PUF implementations is that the PUF key generated in the PUF unit should be kept confidential. Recent advancements in side-channel attacks can potentially enable a PUF key to be discovered from outside the device over a side channel, such as through an analysis of power signatures. The PUF key will typically be output from the PUF unit, over an interconnect, to another part of the chip, every time the device is booted, at a deterministic point within the boot process. Side-channel leakage may be exploited by an attacker who first characterises the interconnect, and then collects a large number of power-consumption traces as the PUF key is output from the PUF unit over the interconnect over repeated device boots. By applying statistical analysis to the traces, given enough traces it may be possible to determine all the bits of the PUF key.

Embodiments of the present invention seek to mitigate this threat.

SUMMARY OF THE INVENTION

From a first aspect, the invention provides an integrated-circuit device comprising:
 a physical-unclonable-function (PUF) unit;
 a secure module;
 an interconnect system communicatively coupled to the PUF unit and to the secure module,
 wherein the integrated-circuit device is configured for transferring a PUF key from the PUF unit to the secure module, over the interconnect system, by:
  the secure module generating a random value;
  the secure module sending the random value to the PUF unit;
  the PUF unit performing a bitwise XOR operation between the received random value and the PUF key, to generate a masked value;
  the PUF unit transferring the masked value over the interconnect system to the secure module; and
  the secure module unmasking the PUF key by performing a bitwise XOR operation between the received masked value and the random value.

From a second aspect, the invention provides a method of operating an integrated-circuit device comprising a physical-unclonable-function (PUF) unit, a secure module, and an interconnect system communicatively coupled to the PUF unit and the secure module, the method comprising transferring a physical-unclonable-function (PUF) key from the PUF unit to the secure module, over the interconnect system, by:
 the secure module generating a random value;
 the secure module sending the random value to the PUF unit;
 the PUF unit performing a bitwise XOR operation between the received random value and the PUF key, to generate a masked value;
 the PUF unit transferring the masked value over the interconnect system to the secure module; and
 the secure module unmasking the PUF key by performing a bitwise XOR operation between the received masked value and the random value.

Thus it will be seen that, in accordance with embodiments of the invention, a random mask can be generated every time the PUF key is transferred over the interconnect system (e.g. during each device boot), and used as a one-time pad to mask the PUF key as it is transferred. This ensures that a different sequence of bits is transferred every time, thereby protecting against side-channel attacks that rely on statistical analysis of multiple traces of a data transfer operation over the interconnect.

The use of bitwise XOR to mask the PUF key advantageously enables the PUF unit to comprise hardware circuitry for masking the PUF key that uses relatively few logic gates. This can make the masking mechanism relatively straightforward and area-efficient to implement in the PUF unit.

The secure module may comprise a memory for storing the unmasked PUF key. The secure module may comprise a hardware cryptographic engine and/or a processor, for performing a cryptographic operation using the PUF key. The secure module may be configured to retain the PUF key securely within the secure module—i.e. never sending it, unencrypted, out from the secure module.

The secure module is preferably configured to send a different random value to the PUF unit each time it sends a random value to the PUF unit. The secure module may use a random number generator—preferably a true (i.e. hardware) random number generator—to generate the random value.

The random value might, in some embodiments, be generated and/or sent in an encoded form (e.g. as mathematically equivalent data, or as a substring of a longer bit string). However, in preferred embodiments, the random value is a bit string of the same bit length as the PUF key, and is generated and sent as such. This may make implementation simple and efficient.

The secure module may send the random value in a single transaction, or it may send the random value over a plurality of transactions, e.g. as a plurality of equal-sized blocks. The PUF unit may transfer the masked value in a single transaction, or it may transfer the masked value over a plurality of transactions, e.g. as a plurality of equal-sized blocks.

The device may be configured (which configuration may, at least in part, be by software stored in a memory of the device) to transfer the PUF key to the secure module within a boot process for the device. Masking the PUF key transfer may be especially beneficial when booting the device, because the boot process will typically be predictable and deterministic, and therefore especially vulnerable to statistical-based side-channel attacks, compared with later operations of the device.

The steps of the secure module generating the random value, sending the random value to the PUF unit, and unmasking the PUF key, may be initiated and/or performed by software (e.g. boot code) executing on a processor of the device, which may be a processor located within the secure module. This software (e.g. boot code) may be stored in a memory (e.g. a ROM) of the device, which may be located within the secure module.

The random value may be sent over the same interconnect system as the masked value.

The interconnect system may comprise one or more buses.

The integrated-circuit device may be a system-on-chip (SoC). It may comprise a main processor and memory, located outside the secure module, communicatively coupled to the interconnect system.

The PUF unit may comprise dedicated logic gates for performing the bitwise XOR operation. The secure module may comprise dedicated logic gates for performing a bitwise XOR operation, or it may comprise a processor and a memory storing software for instructing the processor to perform the bitwise XOR operation to unmask the PUF key.

The device may be configured to prevent a debugger from accessing the interconnect system when the secure module sends the random value to the secure unit and/or when the PUF unit transfers the masked value to the secure module. It may be configured to prevent user-loaded software from executing on any processor of the device that is communicatively coupled to the interconnect system when the secure module sends the random value to the secure unit and/or when the PUF unit transfers the masked value to the secure module. When the sending of the random value occurs within a boot process for the device, the device may be configured to prevent a debugger from accessing the interconnect system during the boot process and/or to prevent user-loaded software from executing during the boot process. Any or all of these features may help mitigate the risk of an attacker using a debugger or malicious software to attempt to sniff the random value and masked PUF key on the interconnect system.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain preferred embodiments of the invention will now be described, by way of example only, with reference to the accompanying drawings, in which:

FIG. 2 is a schematic drawing of part of the PUF of the SoC; and

FIG. 3 is a sequence diagram showing a PUF transfer process performed by the SoC.

DETAILED DESCRIPTION

Figure 1:
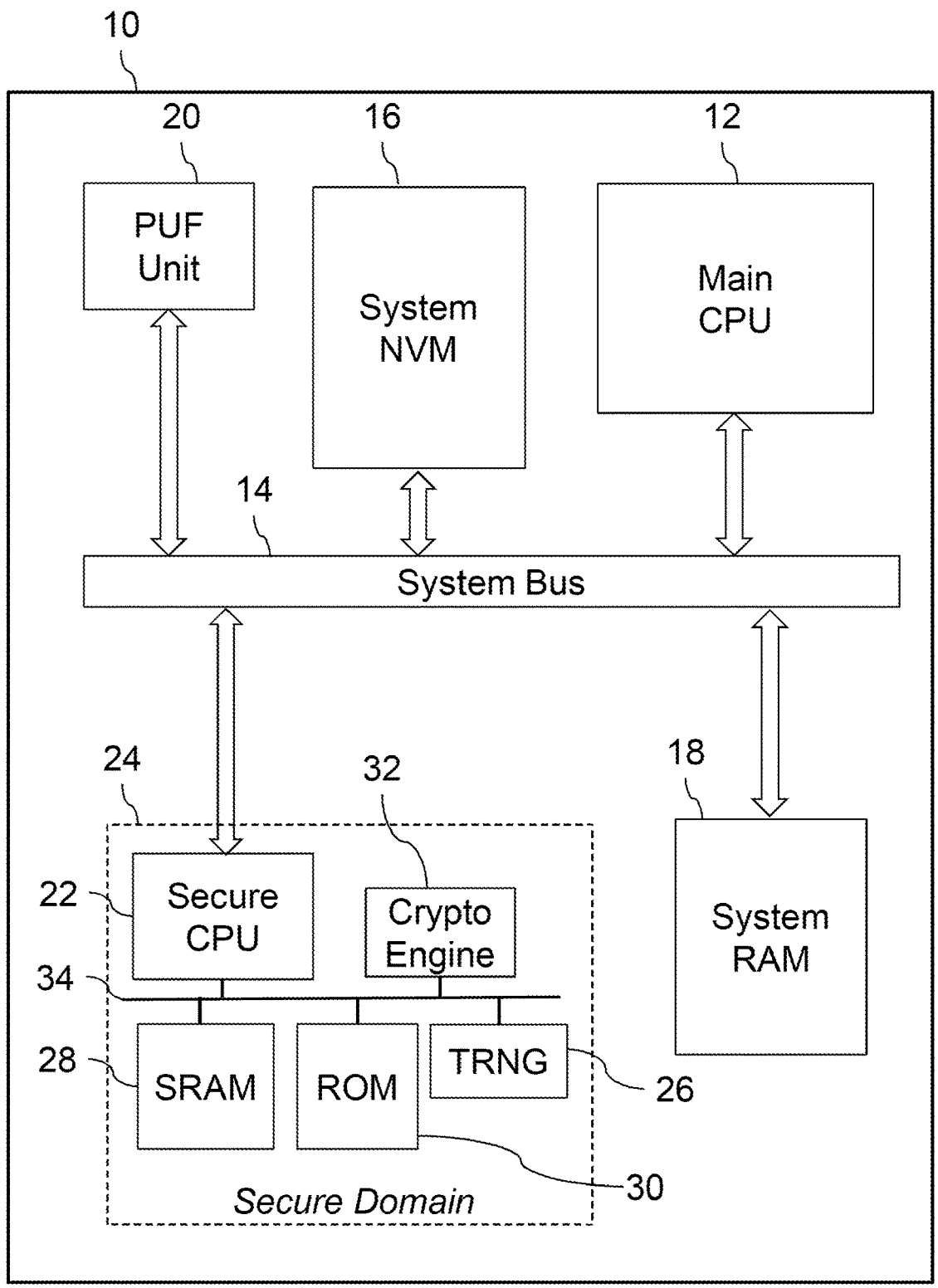
FIG. 1 is a schematic drawings of a system-on-chip (SoC) embodying the invention.

FIG. 1 shows an integrated-circuit system-on-chip (SoC) 10 embodying the invention. It comprises a main central processing unit (CPU) 12, which is connected by a system bus 14 to a system non-volatile memory (NVM) 16 and a system random access memory (RAM) 18. The NVM 16 and RAM 18 may store data and software for execution by the main CPU 12.

Also coupled to the bus are a physical-unclonable-function (PUF) unit 20 and a secure CPU 22.

The secure CPU 22 sits within a secure module 24 that additionally contains a true (hardware) random number generator (TRNG) 26, a secure static random-access memory (SRAM) 28, and a secure read-only memory (ROM) 30, and a hardware cryptographic engine 32, which are all coupled to a secure bus 34 that is separate from the main system bus 14. The secure ROM 30 stores software for execution by the secure CPU 22, including boot code for booting the secure CPU 22. This may be executed within a deterministic boot process for the whole SoC that includes booting the main CPU 12. The SoC 10 may typically be rebooted, and the secure CPU boot code executed, after a reset of the SoC 10, such as a power-on reset.

The SoC 10 may use the secure module 24 for performing sensitive operations such as storing cryptographic keys in the secure SRAM 28 and for performing cryptographic operations, such as AES encryptions, on the secure CPU 22 or using the cryptographic engine 32.

The PUF unit 20 contains hardware circuitry for generating a PUF key (e.g. a 512-bit value) that is unique to the particular implementation of the SoC 10. It can generate the same PUF key repeatedly. It may use any appropriate mechanism for doing this, but in some example embodiments it uses pair of transistors to generate bits for the PUF key.

FIG. 2 shows a representative binary cell 40 of the PUF unit 20. The cell 40 contains two transistors 42, 44 which are arranged such that a small mismatch between then, arising from random manufacturing variations, determines which of the two will rupture first, when a competing oxide rupture process is performed. The outcome is stable and consistent, yet random and unpredictable between different SoC 10 devices all built to the same design.

Each binary cell may directly generate a respective bit of the PUF key. However, in some embodiments the PUF unit 20 may contain more binary cells than the bit-length of the PUF key, and may generate additional helper bits for use within error-correction circuitry in the PUF unit 20, to ensure the stability of the generated PUF key even in changing environmental conditions.

The PUF unit 20 in this SoC 10 lies outside the boundary of the secure module 24 and is not connected directly to the secure bus 34. It is instead coupled to the system bus 14 as a slave device.

The PUF unit 20 includes hardware circuitry for receiving a mask value over the system bus 14 from the secure CPU 24, for performing an XOR operation between the received mask value and the PUF key, and for sending the result to the secure CPU 24 over the system bus 14.

This circuitry is used to enable the secure CPU 24 to receive the PUF key from the PUF unit 20, during a boot process, in a way that is protected against side-channel attacks that attempt to discover the PUF key.

Such attacks might be launched from outside the SoC 10. They may involve a statistical analysis of the power consumption of the SoC 10 during the boot process. For instance, an attacker might first try to characterise the system bus 14 using known data, and then use this knowledge to analyse power traces captured over a large number of repetitions of the boot process to try to discover the PUF key.

However, the SoC 10 protects against this statistical analysis by masking the PUF key, as it is transferred over the system bus 14, with a mask that is randomly-generated afresh for each successive booting of the SoC 10, such that any attack that relies on analysing a plurality of power traces of identical data travelling over the system bus 14, in order to reveal the data, will fail, since the bus traffic will be different every boot.

An attacker might attempt a side-channel attack, rather than a more direct attack on the SoC 10, because the attacker preferably does not have debug access to the SoC 10 during boot, nor the ability to execute software on the device, since the SoC 10 is preferably locked during PUF extraction, with only the secure CPU 24 executing (and not the system CPU 12). Thus an attacker can only passively monitor the mask value and the PUF XOR mask on the interconnect through a side-channel.

In many security contexts, the use of a one-time pad, sent by party A to party B, to mask data that is returned by party B to party A, in a two-way communication exchange, is insufficient for successfully protecting the returned data, since an attacker who is able to access the masked data sent from party B to party A is likely also to have been able to access the one-time pad, as it was sent from party A to party B, and so can trivially unmask the data. However, counter-intuitively, an XOR'd mask is useful in the present context, since an attacker cannot gain sufficient information to mount a successful statistical attack from observing the side-channel leakage from a single, unique exchange, but must be able to analyse a large number of identical exchanges; the use of randomly-generated one-time pads, as disclosed herein, ensures every exchange is different, so can successfully mitigate such a threat.

FIG. 3 shows this process, whereby the secure CPU 22 securely fetches the PUF key from the PUF unit 20, in more detail.

After a reset of the SoC 10, the secure CPU 22 executes 50 boot code from the secure ROM 39. It sends 51 an instruction to the TRNG 26 to generate a random number. The TRNG 26 generates and returns 52 a random number over the secure bus 34. This random number will be used as a one-time mask, for this boot instance only. The secure CPU 22 transfers 53 the number, to use as a mask, to the PUF unit 20 over the system bus 14. The PUF unit 20 generates 54 the unique, device-specific PUF key ("PUF-key") and bit-wise XORs the PUF key with the received mask, within the PUF unit 20. It returns 55 the resulting masked PUF key to the secure CPU 22 over the system bus 14. The boot code causes the secure CPU 22 to calculate 56 the bit-wise XOR of the received masked PUF key with the same mask that it sent to the PUF unit 20. This has the effect of removing the mask and thereby unmasking the PUF key. The secure CPU 22 can then write 57 the unmasked PUF key to the secure SRAM 28, over the secure bus 34. The boot code can then proceed 58 with the rest of the secure boot process.

In this way, the plain, unmasked PUF key is never transferred over a bus outside the PUF unit 20 and outside the secure module 24. The PUF unit 20 and secure module 24 can be more effectively protected against side-channel attacks than non-secure regions of the SoC 10, such as the main system bus 14. This approach can therefore substantially reduce the risk of the PUF key being discovered by an attacker, compared with transferring a plain PUF key over a system bus.

In some embodiments, the PUF key may be transferred from the PUF unit 20 to the secure CPU 22 in multiple blocks—e.g. 32-bit words—rather than in one transaction. In this case, steps 53, 54, 55, 56 of FIG. 3, may be repeated, so that the secure CPU 22 transfers a succession of shorter, randomly-generated masks (e.g. by splitting a 512-bit random number received from the TRNG 26 into sixteen 32-bit words, and sending one 32-bit word at a time), over a plurality of bus transactions, with the PUF unit 20 returning the PUF key in a plurality of transactions, as a succession of masked blocks (e.g. returning a successive masked 32-bit word of the PUF key at each iteration). The secure CPU 22 can unmask each block and concatenate the full PUF key, for storing in the secure SRAM 28.

The PUF unit 20 in this SoC 10 is outside the secure module 24. The SoC 10 is therefore configured to require the boot process to complete before a debugger is allowed any access to the system bus 14. It also requires the boot process to complete before any user-loaded firmware or applications are allowed to execute. These measures can further enhance security by preventing an attacker from using a debugger or user application to try to discover the PUF key by monitoring the system bus 14, during the boot sequence, to snoop on the one-time mask value and the masked PUF key as they are transferred over the bus 14.

The secure CPU 22 or cryptographic engine 32 may subsequently read the PUF key from the secure SRAM 28, over the secure bus 34, and use it for deriving cryptographic keys for the SoC 10, or for performing cipher operations, or in any other appropriate way.

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. An integrated-circuit device comprising:
   a physical-unclonable-function (PUF) unit;
   a secure module;
   an interconnect system communicatively coupled to the PUF unit and to the secure module,
   wherein the integrated-circuit device is configured for transferring a PUF key from the PUF unit to the secure module, over the interconnect system, by:
   the secure module generating a random value;
   the secure module sending the random value to the PUF unit;
   the PUF unit performing a bitwise XOR operation between the received random value and the PUF key, to generate a masked value;
   the PUF unit transferring the masked value over the interconnect system to the secure module; and
   the secure module unmasking the PUF key by performing a bitwise XOR operation between the received masked value and the random value.

2. The integrated-circuit device of claim 1, wherein the secure module comprises a memory for storing the unmasked PUF key.

3. The integrated-circuit device of claim 1, wherein the secure module comprises a hardware cryptographic engine or a processor for performing a cryptographic operation using the PUF key.

4. The integrated-circuit device of claim 1, wherein the secure module is configured to send a different random value to the PUF unit each time the secure module sends a random value to the PUF unit.

5. The integrated-circuit device of claim 1, wherein the secure module is configured to use a true random number generator to generate the random value.

6. The integrated-circuit device of claim 1, wherein the random value has the same bit length as the PUF key.

7. The integrated-circuit device of claim 1, wherein the integrated-circuit device is configured to transfer the PUF key to the secure module within a boot process for the device.

8. The integrated-circuit device of claim 1, wherein the secure module comprises a processor and a memory storing software for execution by the processor, wherein the software comprises instructions for causing the secure module to generate the random value, send the random value to the PUF unit, and unmask the PUF key received from the PUF unit.

9. The integrated-circuit device of claim 1, wherein the secure module is configured to send the random value to the PUF unit over the interconnect system.

10. The integrated-circuit device of a claim 1, wherein the interconnect system comprise one or more buses.

11. The integrated-circuit device of claim 1, wherein the integrated-circuit device is configured to prevent a debugger from accessing the interconnect system when the secure module is sending the random value to the PUF unit and when the PUF unit is transferring the masked value to the secure module.

12. The integrated-circuit device of claim 1, wherein the integrated-circuit device is configured to prevent a debugger from accessing the interconnect system during a boot process of the device.

13. The integrated-circuit device of claim 1, wherein the integrated-circuit device is configured to prevent user-loaded software from executing on any processor of the device that is communicatively coupled to the interconnect system, when the secure module is sending the random value to the PUF unit and when the PUF unit is transferring the masked value to the secure module.

14. The integrated-circuit device of claim 1, wherein the integrated-circuit device is a system-on-chip and further comprises a main processor and memory, located outside the secure module, that are communicatively coupled to the interconnect system.

15. A method of operating an integrated-circuit device comprising a physical-unclonable-function (PUF) unit, a secure module, and an interconnect system communicatively coupled to the PUF unit and the secure module, the method comprising transferring a physical-unclonable-function (PUF) key from the PUF unit to the secure module, over the interconnect system, by:
- the secure module generating a random value;
- the secure module sending the random value to the PUF unit;
- the PUF unit performing a bitwise XOR operation between the received random value and the PUF key, to generate a masked value;
- the PUF unit transferring the masked value over the interconnect system to the secure module; and
- the secure module unmasking the PUF key by performing a bitwise XOR operation between the received masked value and the random value.

* * * * *